United States Patent Office 3,663,453
Patented May 16, 1972

3,663,453
SKELETAL ISOMERIZATION OF OLEFINS OVER HALOGEN-CONTAINING ZIRCONIA CATALYST
John W. Myers, Bartlesville, Okla., assignor to Phillips Petroleum Company
No Drawing. Filed Apr. 20, 1970, Ser. No. 30,278
Int. Cl. B01j 11/78
U.S. Cl. 252—441                                  6 Claims

ABSTRACT OF THE DISCLOSURE

A catalyst suitable for the skeletal isomerization of olefin hydrocarbons comprises zirconia promoted with at least one compound which is a halogen acid or an ammonia halide salt which has been activated by calcination at a temperature of from about 500° to about 1200° F.

BACKGROUND OF THE INVENTION

Field of the invention

This invention relates to skeletal isomerization of olefins using a catalyst.

Description of the prior art

It is frequently necessary to convert olefins into other olefins having a different skeletal arrangement. For example, normal butenes are converted to isobutene for polymerization, alkylation, disproportionation, etc. Similarly, normal amylenes must be converted to isoamylenes prior to dehydrogenation to isoprene.

While a number of catalytic materials possess some activity for such a conversion, not all possess sufficient selectivity to be economical. Because the feeds are generally the relatively reactive olefins, many catalysts cause undesirable side reactions such as polymerization or cracking. Moreover, some catalysts are difficult to prepare and regenerate. Additionally, some catalysts are less effective with certain olefins than with others. Consequently, there is a continuing interest in the development of new skeletal isomerization catalysts and processes to improve efficiencies and to give optimum results for various industrial requirements.

OBJECTS OF THE INVENTION

It is an object of this invention to provide a process and catalyst for skeletal isomerization of olefins. Other objects and advantages of the invention will be apparent from the following detailed description of the invention, examples and appended claims.

SUMMARY OF THE INVENTION

I have discovered a process for skeletal isomerization of olefins which comprises contacting a suitable feed olefin with a suitably activated catalyst consisting essentially of zirconium oxide or compound convertible to zirconium oxide upon calcination which is promoted by a halogen compound.

Further in accordance with the invention, olefins are skeletally isomerized by contacting a feed olefin with a suitably activated catalyst consisting essentially of alumina promoted by a zirconyl halide.

DETAILED DESCRIPTION OF THE INVENTION

The olefins to which the invention process is applicable are those skeletally isomerizable olefins having from about 4 to about 20 carbon atoms per molecule. Acyclic monoolefins having 4–12 carbon atoms per molecule are presently preferred and these can be terminal or internal, and branched or unbranched. Representative examples of the preferred feed olefins include butene-1, butene-2, pentene-1, pentene-2, 4-methylpentene-1, decene-2, dodecene-4, 5,6-dimethylpentadecene-2, eicosene-6, and the like, and mixtures thereof.

One catalyst of the present invention is produced by associating a zirconyl halide ($ZrOX_2$), where X is chloride, bromide, fluoride or iodide, with alumina. Of these halides the zirconyl chloride is preferred. Generally, the order of increasing effectiveness of the halides is iodide, fluoride, bromide, and chloride.

The alumina which is used for the support material for the catalyst system of the present invention can be any suitable catalytic grade of alumina. Preferred aluminas are those which are active for converting olefins, including those forms of alumina known in the art as eta and gamma alumina. The most preferred is the form of alumina known in the art as eta-alumina. Eta-alumina is conveniently produced by calcination of beta-alumina trihydrate.

The catalyst is prepared by incorporating from about 0.4 to about 15 weight percent, preferably 1–10 weight percent based on the total composition, of the zirconyl halide into the selected alumina. Any suitable method of incorporation can be used. The incorporation is preferably carried out by impregnating a previously dried and calcined alumina with an aqueous solution of the desired zirconyl halide. However, if desired, the zirconyl halide can be incorporated at a point earlier in the preparation of the alumina. For example, the zirconyl halide can be mixed with a wet alumina hydrogel prior to its drying and calcination. Whichever form of associating the zirconyl halide with the alumina is used, the final composition is calcined at a temperature and for a period of time sufficient to provide an active catalyst. This generally requires calcination at a temperature of about 500° F. to about 1200° F. for a time of 0.1 to about 25 hours, preferably 0.5 to 10 hours, in flowing air or other suitable gas such as nitrogen, argon and the like. At the completion of activation, it is frequently desirable to flush the activated catalyst with a stream of dry inert gas such as nitrogen.

In another embodiment of the invention, a catalyst is prepared by associating a halogen compound with zirconia. In a preferred method, a previously dried and calcined catalytic grade of zirconia is subjected to an aqueous impregation of from about 0.1 to about 10 weight percent, preferably 1 to 5 weight percent, of halogen acid and/or an ammonium halide salt, based upon the total weight of the composition. Alternatively, a wet hydrogel of zirconia can be similarly mixed with the halogen acid and/or the ammonium halide salt. Whichever form of procedure is used, the catalyst composite is calcined, before use, at a temperature suitable to activate the catalyst for the isomerization reaction. Generally, the activation is at a temperature of about 500–1200° F. for about 0.1 to about 25 hours, preferably 0.5 to about 10 hours. Flowing air or other suitable gas such as nitrogen, argon, and the like can be employed. Hydrogen chloride is the presently preferred halogen compound. Any conventional catalytic grade zirconia, including zirconia gel and flame hydrolyzed zirconia, can be used in the preparation of this catalyst.

Each of the above-described catalysts can be regenerated. That is, they can be heated at 500–1200° F. in the presence of an oxygen-containing gas until their effectiveness is substantially restored.

The skeletal isomerization process of the present invention is carried out by contacting the feed with the catalyst, using any suitable contacting techniques, at a suitable temperature at which skeletal isomerization of the feed olefins will occur. The temperature is preferably in the range of from about 400–1200° F., and more preferably 600–1100° F. The liquid hourly space rate will generally be in the range of from about 0.1 to about 50, preferably 0.5–30. Any convenient pressure can be used, with the lowest practical pressure preferred in order to minimize side reactions such as polymerization. Pressures ranging from atmospheric to 200 p.s.i.g. are particularly suitable.

The olefinic feed stream can be diluted, if desired, with essentially inert diluents such as, for example, paraffins having from 1 to about 5 carbon atoms or other gases such as nitrogen or hydrogen. The diluent can be present in any desired proportion such as, for example, from about 5 to about 95 weight percent of the olefinic feed stream. Olefinic refinery streams containing a wide variety of nonolefinic diluents can sometimes be used as a feed stream for the present invention process.

In general, lower conversion temperatures are used for feeds containing larger olefin molecules. For example, butene feeds are generally converted at about 900° F. while pentene feeds are frequently converted at about 800° F. for optimum results.

It is frequently desired, in normal operation, to maintain the activity of the catalysts by the addition of small amounts of compounds of chlorine, bromine, or iodine, preferably hydrogen or chlorine, to the feed stream. The hydrogen halide acids, preferably hydrogen chloride, are generally used for this purpose although easily decomposable hydrocarbyl halides such as, for example, tertiarybutyl chloride, can also be used for this purpose. These halogen compounds are added to the feed in amounts ranging from about 5 to about 500 parts per million, preferably 10–200 p.p.m. Generally the smallest effective addition of such halide compounds is used to minimize corrosion of equipment.

The invention can be illustrated by the following examples. However, the data employed therein is for the purpose of illustration, and should not be construed as limiting the scope of the invention as described hereinabove.

EXAMPLE I

An alumina-zirconium oxychloride catalyst was prepared. A 3.88 g. quantity of $ZrOCl_2 \cdot 8H_2O$ was diluted to 44 ml. with deionized water and slurried with 46.7 g. of a 10–20 mesh commercial catalytic grade alumina (Filtrol 400-8 alumina). The slurry was then dried at 212° F. and then calcined in flowing air at 700° F. for about 16 hours. Thus the alumina was associated with 4.4 weight percent of the zirconyl chloride, based on the weight of the total composition.

For purposes of comparison, another catalyst was similarly prepared by impregnating the same alumina to contain about 5.6 weight percent of zirconyl nitrate. After impregnation, this catalyst composition was similarly dried and calcined.

The above-described catalysts, as well as a portion of the non-impregnated alumina, were tested for effectiveness for skeletal isomerization of butene-2. Prior to use, each of these catalytic compositions was again heated at 900° F. in flowing nitrogen for about 1 hour.

Each of these catalysts was used to form a fixed catalytic bed in a tubular reactor. Butene-2 feed, diluted in a 4/1 mole ratio of nitrogen to butene, was then passed over the bed at 900° F., at 2 LHSV, and at atmospheric pressure. The reactor effluent was then analyzed and the results of these tests are shown in the following Table I.

TABLE I.—SKELETAL ISOMERIZATION OF BUTENE-2

| Catalyst | Run Number | | |
|---|---|---|---|
| | 1 | 2 | 3 |
| | $Al_2O_3$ plus $ZrOCl_2$ | $Al_2O_3$ plus $ZrO(NO_3)_2$ | $Al_2O_3$ |
| Effluent analysis, wt. percent: | | | |
| $C_2+C_3$ | 1.10 | 0.20 | 0.39 |
| Butane | 0.26 | 0.17 | 0.18 |
| Butene-1 | 16.33 | 26.01 | 24.07 |
| Isobutene | 34.52 | 4.50 | 10.33 |
| Butene-2 | 45.91 | 69.13 | 64.89 |
| $C_5+$ | 1.87 | 0.00 | 0.15 |
| Total | 99.99 | 100.01 | 100.01 |

The high isobutene content in the effluent from Run 1 demonstrates that the catalysts formed by the association of zirconyl chloride with alumina is very effective for skeletal isomerization. This is indeed surprising when one compares Run 2 with Run 3. In Run 3, it is seen that the nonpromoted alumina has some activity for skeletal isomerization. However, when a zirconium compound in the form of zirconyl nitrate is used to promote the alumina as in Run 2, there is a loss in skeletal isomerization activity as compared to that of the run with alumina alone.

EXAMPLE II

In a manner analogous to that of Example I, several other catalysts were prepared by associating alumina with several different metal halide compounds. In each of the catalysts, the alumina was impregnated with 4.0–4.5 weight percent of the metal halide based on the weight of the total composite. As in Example I, each of these catalysts was tested for skeletal isomerization of butene-2 at 900° F., at 2 LHSV, at atmospheric pressure, and at a 4/1 mole ratio of nitrogen to butene-2. The results of these tests are shown in Table II below:

TABLE II.—SKELETAL ISOMERIZATION OF BUTENE-2

| Run | Catalyst | Percent Conversion | Selectivity |
|---|---|---|---|
| 4 | Alumina plus zirconyl chloride | 37.8 | 91.4 |
| 5 | Alumina plus zinc chloride | 9.0 | 61.4 |
| 6 | Alumina plus tin chloride | 8.3 | 96.1 |
| 7 | Alumina plus magnesium chloride | 8.7 | 97.1 |
| 8 | Alumina plus calcium chloride | 0.1 | 0.0 |

The data in the above table show that among the five different metal halides tested, the catalyst with zirconyl chloride is unique in that it results in a high conversion of butene-2 to isobutene with a high selectivity.

EXAMPLE III

A zirconia-HCl catalyst was prepared. A 15.2 g. quantity of catalytic zirconia gel was impregnated with 4.6 g. of 37.0–38.0 percent hydrochloric acid which had been diluted to 30 ml. with deionized water. After slurrying the mixture for about 1 hour, 20 ml. of the solution was decanted from the zirconia gel and the gel was dried at 212° F. in a forced-draft oven. Thus, the zirconia gel was impregnated to contain 3.6 weight percent of HCl.

In a like manner, a zirconia-$NH_4F \cdot HF$ catalyst was prepared. An 11.5 g. quantity of the same zirconia gel was impregnated with a 20 ml. solution containing 1.0 g. of ammonium acid fluoride. After slurrying for about 1 hour, a 12.5 ml. quantity of the liquid was decanted from the zirconia gel and the gel was dried in a forced-draft oven at 212° F. From the quantity of the impregnant adsorbed by the zirconia gel, the zirconia was impregnated to contain 3.1 weight percent of the ammonium acid fluoride based on the weight of the total composite.

The zirconia gel used above was prepared by precipitating an aqueous solution of zirconyl nitrate with aqueous ammonium hydroxide. The resulting hydrous gel was aged, dried, washed, redried, and calcined.

The above two catalysts, together with a sample of the nonimpregnated zirconia gel, were tested in a butene-2 skeletal isomerization reaction. These catalysts were charged into a tubular fixed bed reactor and activated at 900° F. in flowing nitrogen for about 1 hour. Butene-2 was then admitted at 850° F., at 2 LHSV, at atmospheric pressure and at a 4/1 mole ratio of nitrogen to butene-2. The results are shown in Table III below.

TABLE III.—SKELETAL ISOMERIZATION OF BUTENE-2

| Catalyst | Run Number | | |
|---|---|---|---|
| | 9 | 10 | 11 |
| | $ZrO_2$ | $ZrO_2$ plus HCl | $ZrO_2$ plus $NH_4F \cdot HF$ |
| Effluent analysis, wt. percent: | | | |
| $C_2+C_3$ | 0.40 | 0.51 | 3.02 |
| Butane | 0.16 | 0.53 | 1.32 |
| Butene-1 | 26.11 | 40.23 | 17.72 |
| Isobutene | 0.00 | 5.01 | 22.02 |
| Butene-2 | 73.33 | 53.21 | 51.65 |
| $C_5+$ | 0.00 | 0.51 | 4.28 |
| Total | 100.00 | 100.00 | 100.01 |

The data show that the zirconia catalyst of Run 9 was not active for skeletal isomerization of butene-2 under these conditions. On the other hand, substantial amounts of isobutenes were produced in Runs 10 and 11 in which the invention catalysts were used.

Reasonable variation and modification of my invention is possible without departing from the spirit and scope thereof.

I claim:

1. A catalyst consisting essentially of zirconia promoted with from about 0.1 to about 10 weight percent of at least one compound which is a halogen acid or an ammonium halide salt, the catalyst having been activated by calcination at a temperature of from about 500° to about 1200° F.

2. The catalyst of claim 1 wherein the zirconia is promoted with from about 1 to about 5 weight percent of at least one compound of a halogen acid or an ammonium halide salt.

3. The catalyst of claim 1 wherein the zirconia is a zirconia gel or flame hydrolyzed zirconia.

4. The catalyst of claim 3 wherein the calcination occurs for a period of from about 0.1 to about 25 hours in flowing air.

5. The catalyst of claim 2 wherein the halogen acid is hydrogen chloride.

6. The catalyst of claim 2 wherein the ammonium halide salt is ammonium acid fluoride.

References Cited

UNITED STATES PATENTS

| 2,449,061 | 9/1943 | Darling | 252—441 X |
| 2,943,128 | 6/1960 | Folkins et al. | 252—441 X |
| 3,049,572 | 8/1962 | Stahl et al. | 252—441 X |

PATRICK P. GARVIN, Primary Examiner

U.S. Cl. X.R.

260—683.2